US010010903B2

(12) United States Patent
Zabalza Goni et al.

(10) Patent No.: US 10,010,903 B2
(45) Date of Patent: Jul. 3, 2018

(54) MELTER

(71) Applicant: MELER APLICADORES DE HOT-MELT, S.A., Orcoyen (Navarra) (ES)

(72) Inventors: Jose Zabalza Goni, Orcoyen (ES); Carlos Tellechea Bidegain, Orcoyen (ES)

(73) Assignee: MELER APLICADORES DE HOT-MELT, S.A., Orcoyen (Navarra) (ES)

( * ) Notice: Subject to any disclaimer, the term of this patent is extended or adjusted under 35 U.S.C. 154(b) by 199 days.

(21) Appl. No.: 14/909,837

(22) PCT Filed: Aug. 4, 2014

(86) PCT No.: PCT/ES2014/000132
§ 371 (c)(1),
(2) Date: Feb. 3, 2016

(87) PCT Pub. No.: WO2015/018953
PCT Pub. Date: Feb. 12, 2015

(65) Prior Publication Data
US 2016/0175875 A1    Jun. 23, 2016

(30) Foreign Application Priority Data

Aug. 7, 2013  (ES) .................................. 201331242

(51) Int. Cl.
*F16J 15/32*    (2016.01)
*B05C 5/00*    (2006.01)
(Continued)

(52) U.S. Cl.
CPC .............. *B05C 5/001* (2013.01); *B05C 11/10* (2013.01); *B05C 11/1042* (2013.01); *F16J 13/16* (2013.01); *F16J 15/32* (2013.01)

(58) Field of Classification Search
CPC .............. F16J 15/32; B05C 5/04; B05C 11/10
(Continued)

(56) References Cited

U.S. PATENT DOCUMENTS 3,759,415 A * 9/1973 Cloyd ................ B65D 43/0212
220/324
3,909,376 A * 9/1975 Degner ..................... C25B 3/00
205/452
(Continued)

FOREIGN PATENT DOCUMENTS

EP    0005707 A2    12/1979
EP    0107077 A1    5/1984
(Continued)

OTHER PUBLICATIONS

Translation of Written Opinion for PCT/ES2014/000132.
International Search Report dated Sep. 8, 2014 for PCT/ES2014/000132 and English translation.

*Primary Examiner* — Gregory Huson
*Assistant Examiner* — Nikhil Mashruwala
(74) *Attorney, Agent, or Firm* — Lucas & Mercanti, LLP

(57) ABSTRACT

The invention relates to a melter, comprising a block (2) having a detachable shell (6), in which there is housed a melting chamber (3) provided with an upper opening that is closed with a hinged and detachable lid (11), the chamber (3) being arranged on lower supports (7), with the freedom to expand upwards, the opening of said chamber (3) incorporating a gasket (8) having an upwardly inclined flexible lip in the outer part on which the shell (6) rests, establishing sealed closure with respect to the chamber (3), whereas on the gasket (8) there is arranged a frame (9) having an upward vertical flange, with respect to which the lid (11) that closes on the gasket (8) is assembled, such that when the chamber (3) expands due to the temperature, the flexible lip allows the expansion maintaining leak-tightness.

5 Claims, 5 Drawing Sheets

(51) Int. Cl.
*F16J 13/16* (2006.01)
*B05C 11/10* (2006.01)

(58) Field of Classification Search
USPC .......................................... 126/284; 222/146
See application file for complete search history.

(56) References Cited

U.S. PATENT DOCUMENTS

| | | | | |
|---|---|---|---|---|
| 4,308,447 A * | 12/1981 | Notzold | ................ | B29B 13/022 |
| | | | | 118/202 |
| 4,485,941 A * | 12/1984 | Frates | ................... | B29B 13/022 |
| | | | | 222/146.5 |
| 5,669,922 A * | 9/1997 | Hood | ............... | A61B 17/32006 |
| | | | | 606/169 |
| 5,735,588 A | 4/1998 | Dittman et al. | | |
| 6,116,151 A * | 9/2000 | Fickert | ................ | A47J 27/0813 |
| | | | | 220/316 |
| 6,695,319 B1 * | 2/2004 | Anota | .................... | A47J 27/09 |
| | | | | 220/203.11 |
| 8,931,402 B2 * | 1/2015 | Chameroy | .......... | A47J 27/0806 |
| | | | | 99/352 |
| 2017/0312778 A1 * | 11/2017 | Ramosevac | ............. | B05C 5/001 |

FOREIGN PATENT DOCUMENTS

ES    2356758 A1    4/2011
FR    2749746 A1    12/1997

\* cited by examiner

MELTER

CROSS REFERENCE TO RELATED APPLICATIONS

This Application is a 371 of PCT/ES2014/000132 filed on Aug. 4, 2014, which, in turn, claimed the priority of Spanish Patent Application No. P201331242 filed on Aug. 7, 2013, both applications are incorporated herein by reference.

TECHNICAL FIELD

The present invention relates to the application of hot-melt materials, and more specifically to the melting of said materials for the application thereof, proposing a melter for that purpose with features that improve the insulation of the functional parts for preserving them, nevertheless allowing easy access to inner parts for maintenance.

STATE OF THE ART

Certain materials, such as hot-melt adhesives or glues, are solid at room temperature and when a higher temperature is applied to them they become pasty, until acquiring a fluidity that allows the application thereof by deposition using guns or similar means, said materials again reaching the solid state when they cool, without losing their structural features.

These materials, referred to as hot-melt materials, are used in many applications as attaching or covering means, such that they are supplied in solid state, being melted by means of heat when they are going to be applied, for which purpose a melter is used which consists of a melting chamber and a system for driving the fluid material, once it is melted, for the application thereof.

Melters existing for the application of hot-melt materials have the drawback, however, that when the melting chamber overflows or when molten material slides out when the lid of said melting chamber is opened, the overflowing or sliding molten material enters the area where the functional elements of the melter are located, being able to cause operating malfunctions and shorten the service life of the melter.

OBJECT OF THE INVENTION

According to the invention, a melter is proposed for the application of hot-melt materials, made with structural features preventing the entry of molten material into the parts where the functional elements are located, effectively correcting the drawback of conventional hot-melt material melters and applicators in this regard.

This melter object of the invention comprises a block housing the control elements of an electrical system and of a pneumatic system, and a block housing a melting chamber of the hot-melt materials and the outlet system for the molten hot-melt material for the application thereof.

In the block corresponding, the melting chamber for melting the hot-melt materials is arranged in a floating assembly, with the freedom to expand upwards, said melting chamber having an opening in the upper part, on the edge of which there is arranged a gasket having an upwardly inclined flexible lip in the outer part, there being on said gasket a perimetral frame having an upward vertical flange, that frame having an upper notch in the vertical flange of an edge, whereas posts emerge upwards from the frame in the opposite part, said posts having a notch in the upper part; whereas covering the arrangement of the melting chamber there is provided a shell supporting said melting chamber on the inclined flexible lip of the gasket of the opening, that shell having in the upper part a practicable lid assembled such that it swings, which lid in the closed position is supported on the gasket of the edge of the opening of the melting chamber.

A melter is thereby obtained in which between the melting chamber and the cover shell there is a complete leak-tightness preventing any overflow or sliding of the molten material being able to fall into the functional elements located outside the chamber, due to the support of the cover shell on the inclined flexible lip of the gasket of the opening of the melting chamber, and because the expansions of said melting chamber increase the tightness of the sealed closure between the shell and the melting chamber, preventing the passage of molten fluid material between them. The upper notch of the vertical flange of an edge of the frame of the opening of the melting chamber also acts as an overflow so that if said melting chamber is filled too much, the surplus molten material comes out through said notch.

In relation to the area of the swing rotation of the lid of the cover shell covering the melting chamber, the shell defines a vertically arcuate edge, with respect to which the edge of the lid acts as a scraper when said lid swings towards the open position, carrying away the molten fluid material that may have been deposited on that edge, to make that material fall into the melting chamber.

The lid of the shell furthermore has on its lower face a structure in the form of an inverted pan which, when the lid swings towards the open position, makes the molten fluid material that may have been deposited on that lower face of the shell fall directly into the melting chamber. Said structure in the form of an inverted pan furthermore establishes, with its edge, support on the gasket of the edge of the opening of the melting chamber, establishing an effective closure seal of the lid in the closed position, with respect to the melting chamber, to prevent the passage of molten fluid material through said closure.

The swinging assembly of the lid of the shell is established by support, by means of pivots of the lid, in upper notches of the posts of the frame of the opening of the melting chamber, such position being reached by the supporting pivots entering through front grooves of the shell in said assembly area of the lid, whereby resulting in a secure assembly of the lid with freedom to swing for opening and closing; nevertheless, the lid can be readily detached for cleaning or maintenance operations by means of a lifting motion and a forward extraction movement.

As a result, the proposed melter offers features making it advantageous and preferred with respect to melters known today for use in melting and applying hot-melt materials.

DETAILED DESCRIPTION OF THE INVENTION

Figure 1:
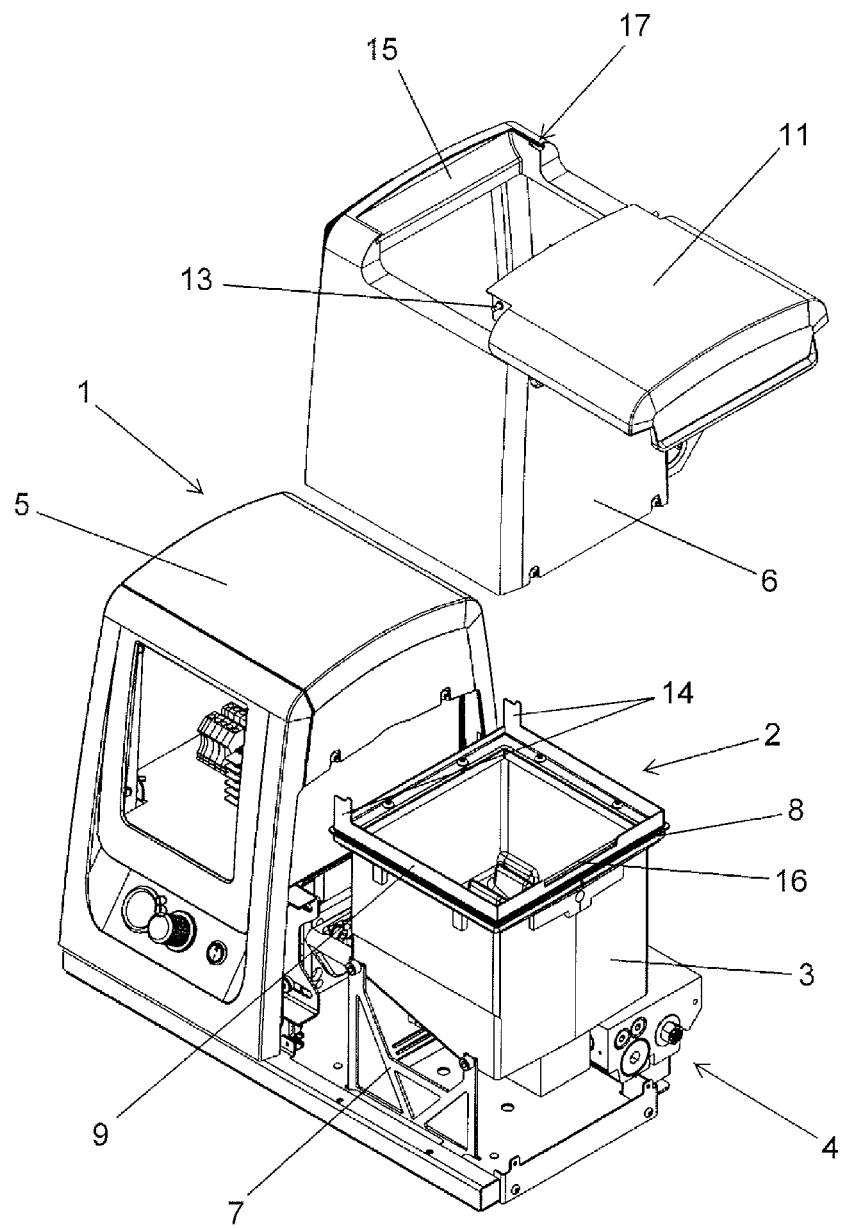
FIG. 1 shows a perspective view of a melter for hot-melt materials according to the invention, with the cover shell of the melting chamber being raised with respect to the assembly position and the upper lid of said shell being extracted towards the front.
Figure 2:
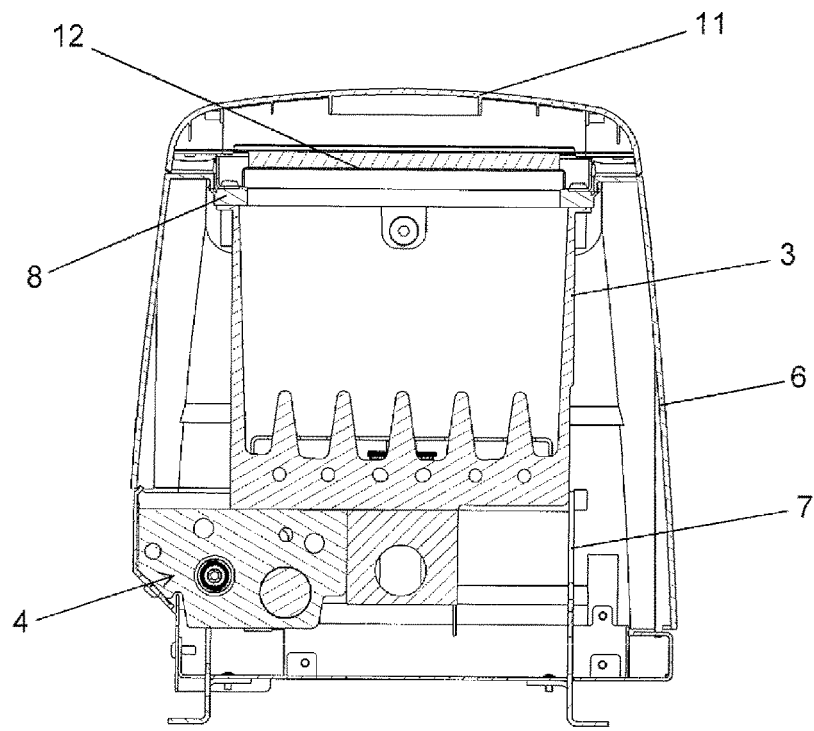
FIG. 2 is a cross-section view of the block containing the melting chamber in the melter in the preceding figure, with the cover shell placed in its assembly position.
Figure 3:
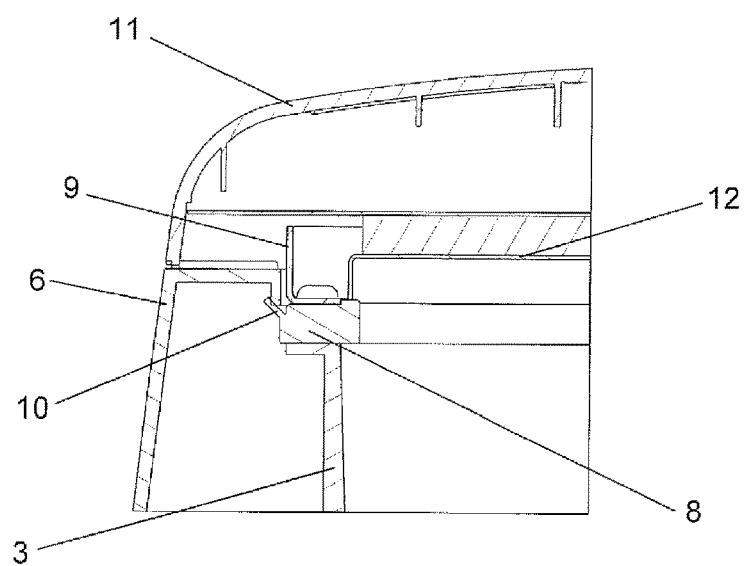
FIG. 3 is an enlarged partial detail of an area of the preceding figure in which the support of the shell and of the lid on the gasket of the opening of the melting chamber is seen.
Figure 4:
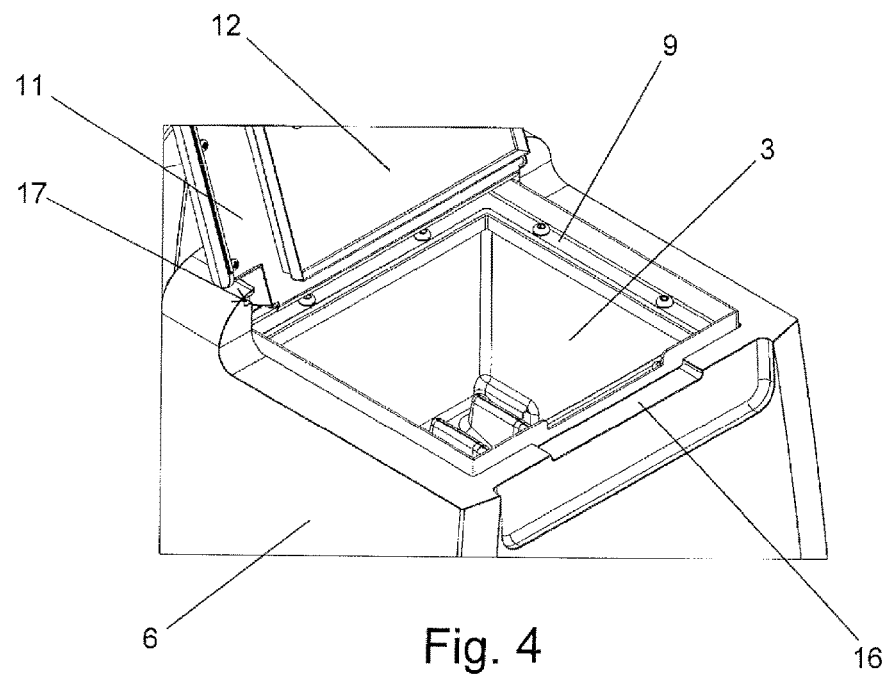
FIG. 4 is a partial perspective view in which the opening of the melting chamber of the melter with the lid in the open position is seen.
Figure 5:
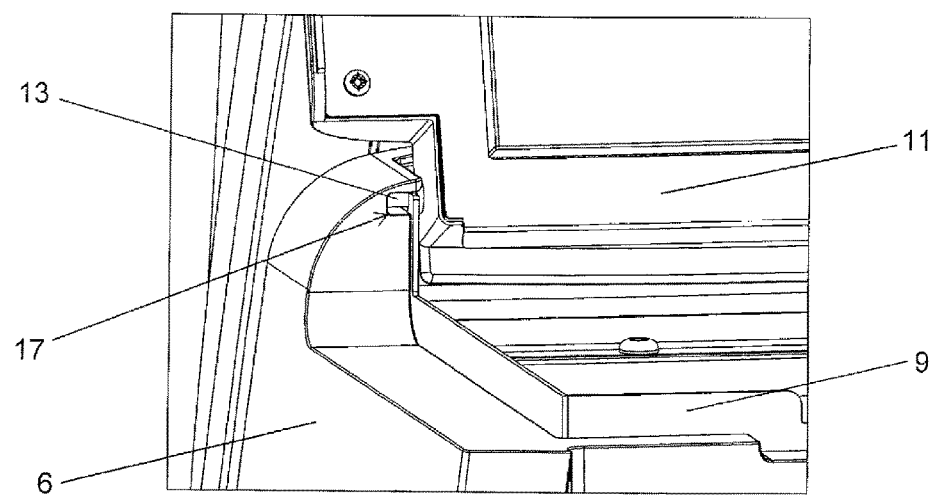
FIG. 5 is an enlarged detail of one of the areas of the assembly coupling of the lid of the melting chamber in the melter of the invention.
Figure 6:
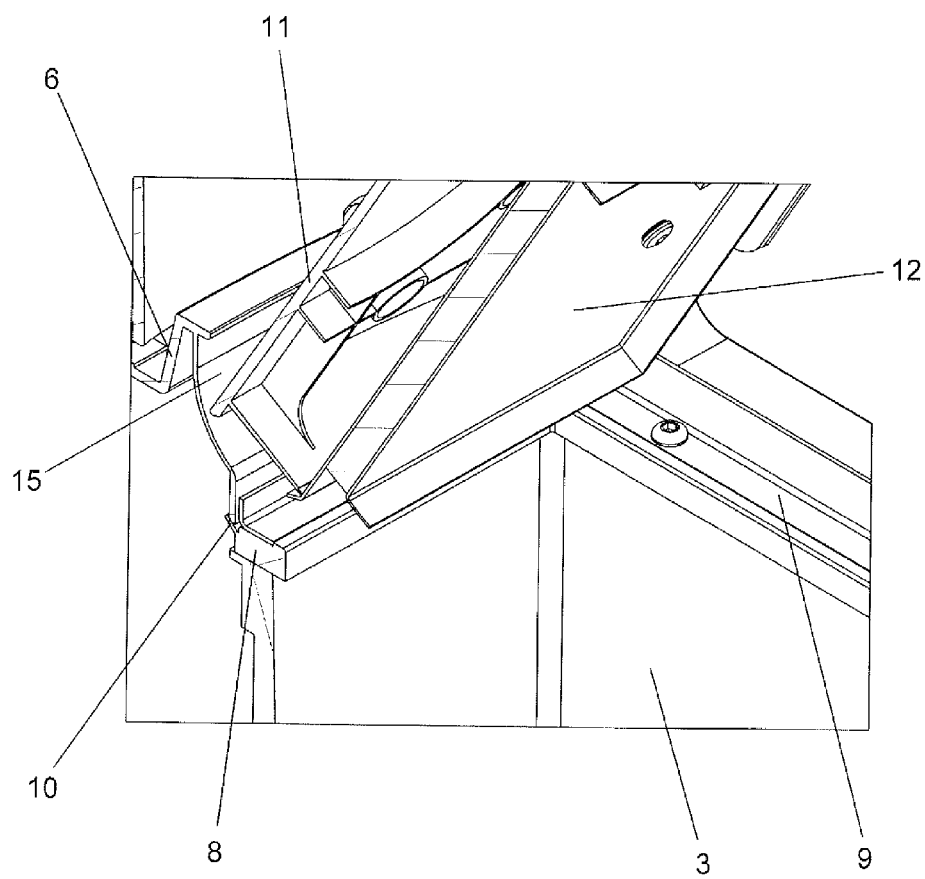
FIG. 6 is a perspective view of a detail of the relation of the scraping function of the lid of the melting chamber with respect to the edge of the cover shell in the melter of the invention.
Figure 7:
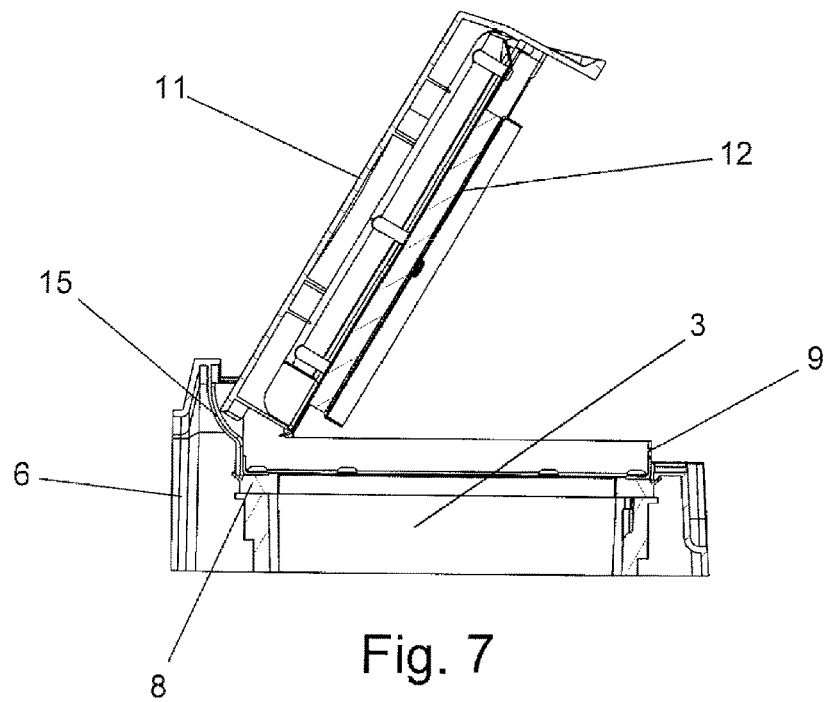
FIGS. 7 and 8 are respective sectional side views showing the swiveling of the lid of the melting chamber, in an intermediate swivel position and in the open complete swivel position, respectively.
Figure 8:
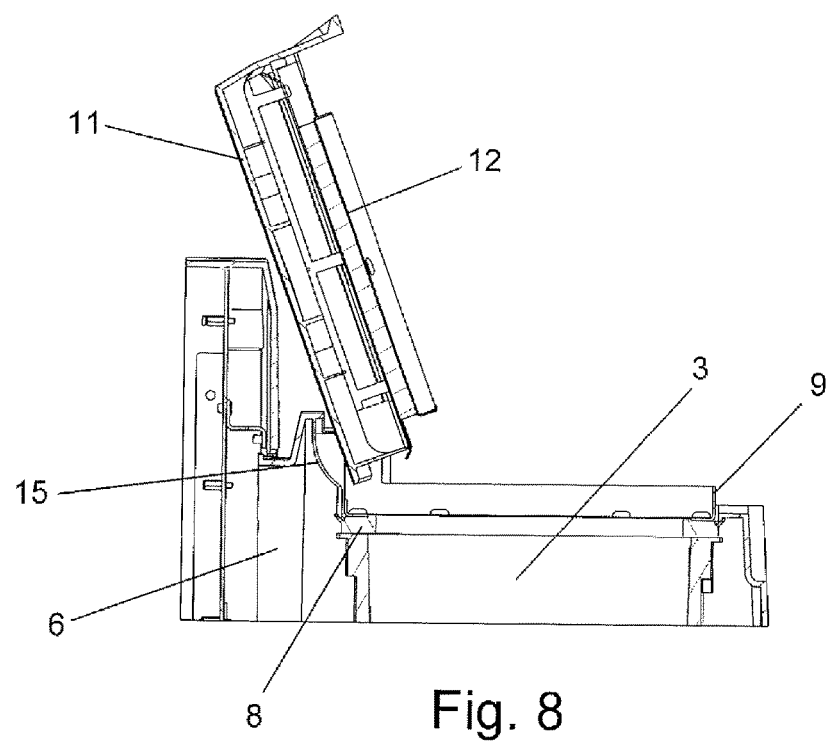

The object of the invention relates to a melter intended for applying hot-melt materials, comprising a block (1) housing the control elements of an electrical system and of a pneumatic system, and a block (2) in which there is housed a melting chamber (3) for melting the hot-melt materials in order to turn them into fluid material, and the elements of an outlet system (4) for the molten fluid material for the application thereof, said blocks (1 and 2) incorporating respective cover shells (5 and 6) which can be removed independently for required internal repair or maintenance operations.

The melting chamber (3) for melting the hot-melt materials is arranged in the corresponding block (2) in a floating assembly by means of being held on lower supports (7), with the freedom to expand upwards due to the effect of the temperatures required for melting the hot-melt materials, said chamber (3) having an opening in the upper part, on the edge of which there is arranged a gasket (8) and on it an L-shaped frame (9) having an upward vertical flange.

The gasket (8) has an upwardly inclined flexible lip (10) in the outer part, on which the shell (6) of the block (2) rests when assembled, establishing a sealed closure with respect to the chamber (3), such that when said chamber (3) expands upwards due to the temperature, the flexible lip (10) allows such expansion without creating stresses that may deform the shell (6) and without losing the closure seal with respect to the chamber (3), since it increases the pressure of the support between the shell (6) and the flexible lip (10), enhancing the leak-tightness. Said closure between the shell (6) and the flexible lip (10) of the gasket (8) additionally acts as a heat barrier to prevent heat from sliding out of the chamber (3), which allows making maximum use therein of the heat used to melt the hot-melt materials.

The shell (6) has a lid (11) in the upper part which incorporates a structure (12) in the lower face in the form of an inverted pan, whereby in the closed position it is supported on the gasket (8), establishing a sealed closure around the opening of the chamber (3). Therefore, a closure is established on the chamber (3) by means of the lid (11) which allows optimally making use of the heat inside said chamber (3) to melt the hot-melt materials, while at the same time preventing the material being melted from being able to splatter outside the melting compartment.

The structure (12) in the form of an inverted pan furthermore collects the molten material that may splatter onto the lower face of the lid (11), such that the splattered molten material falls from said structure (12) directly into the chamber (3), without sliding out of same.

The lid (11) is arranged in a supporting assembly by means of pivots (13) on the sides of its rear end, on posts (14) emerging upwards from the frame (9), which posts (14) have notches in the upper part where the pivots (13) engage, such that the lid (11) can swing between an open position and a closed position, rotating with respect to such supports of the pivots (13) on the posts (14).

In that arrangement, when the lid (11) swings towards the open position, the structure (12) making the molten material that may be deposited thereon due to the splattering occurring during melting slide from said structure (12) to also fall directly into the chamber (3).

Furthermore, in the assembly area of the lid (11), the shell (6) defines a vertically arcuate edge (15), with which the corresponding edge of the lid (11) is related, such that said corresponding edge of the lid (11) acts as a scraper on said arcuate edge (15) of the shell (6) when the lid (11) swings. Therefore, when the lid (11) swings to the open position, it carries away the molten material that may have been deposited on the mentioned arcuate edge (15) of the shell (6) into the chamber (3).

In turn, the frame (9) of the opening of the chamber (3) has a notch (16) in an area of its vertical flange acting as an overflow so that if there is excessive filling of the chamber (3), the material that is melted therein will exit the melter without overflowing over the rest of the contour of the opening of the chamber (3).

In the assembly area for the lid (11), the shell (6) has grooves (17) frontally facing the posts (14), such that the pivots (13) can enter and exit through said grooves (17) for the assembly and detachment of the lid (11), which can be extracted from its assembly quite easily by simply lifting it up slightly until the pivots (13) come out of the upper notches of the posts (14) and then moving it forward, the pivots (13) going through the grooves (15); whereas the assembly is performed in an equally easy manner, but inversely, i.e., introducing the pivots (13) into the grooves (15) until said pivots (13) engage in the upper notches of the posts (14).

The invention claimed is:

1. A melter comprising:
   a melting chamber comprising an upper opening;
   an outlet system for the molten material for the application thereof;
   lower supports holding the melting chamber with the freedom to expand upwards,
   a cover shell to cover the melting chamber, the outlet system and the lower supports, the cover shell comprising a lid for closing the upper opening of the melting chamber,
   wherein the upper opening of said melting chamber comprises an edge, and a gasket is arranged on the edge,
   wherein the edge supports the lid in a closed position,
   wherein said gasket comprises an upwardly inclined flexible lip in an outer part on which the cover shell rests, establishing a sealed closure with respect to the melting chamber, and
   wherein an L-shaped frame having an upward vertical flange is arranged on the gasket configured to swing between the closed position and an open position.

2. The melter according to claim 1, wherein the lid is detachable and comprises pivots on sides of a rear end of said lid wherein posts upwardly emerge from the L-shaped frame, wherein the cover shell comprises grooves facing said posts such that the pivots enter and exit through the grooves for the assembly and detachment of the lid.

3. The melter according to claim 1, wherein the lid incorporates a structure on a lower face in the form of an inverted pan, which rests on the gasket in the closed position of the lid, establishing a sealed closure around the opening of the melting chamber.

4. The melter according to claim 1, wherein the cover shell defines an angular arcuate edge on which a corresponding edge of the lid acts as a scraper when said lid swings carrying away molten material deposited on the arcuate structure.

5. The melter according to claim 1, wherein the L-shaped frame comprises a notch in an area of a vertical flange acting as an overflow for the melting chamber.

\* \* \* \* \*